United States Patent [19]
Fujisaki

[11] Patent Number: 5,594,523
[45] Date of Patent: Jan. 14, 1997

[54] LENS COVER MECHANISM FOR A CAMERA

[75] Inventor: Yoshifumi Fujisaki, Tokyo, Japan

[73] Assignee: Asahi Kogaku Kogyo Kabushiki Kaisha, Tokyo, Japan

[21] Appl. No.: 360,075

[22] Filed: Dec. 20, 1994

[30] Foreign Application Priority Data

Dec. 27, 1993 [JP] Japan ................. 5-070104 U

[51] Int. Cl.[6] ........................ G03B 17/02
[52] U.S. Cl. ........................ 396/448
[58] Field of Search .................. 354/288, 246, 354/248; 359/511

[56] References Cited

U.S. PATENT DOCUMENTS 3,062,098  11/1962  Dowling et al. .
4,051,502   9/1977  Mielke .
4,130,357  12/1978  Erlichman et al. .
4,522,478   6/1985  Kando et al. .

*Primary Examiner*—David M. Gray
*Attorney, Agent, or Firm*—Greenblum & Bernstein P.L.C.

[57] ABSTRACT

A lens cover mechanism for a compact camera which uses a plurality of lens cover plates having a first state in which the cover plates partially overlap, and together cover a lens of the camera. In a second state, the cover plates are substantially overlapping and disposed to a side of the camera lens, completely exposing the lens.

20 Claims, 3 Drawing Sheets

LENS COVER MECHANISM FOR A CAMERA

BACKGROUND OF THE INVENTION

The present invention relates to compact cameras, and more specifically, to mechanisms for covering and exposing a lens to protect the lens from debris or damage. Modern compact cameras typically include some form of integral lens cover mechanism, where a cover barrier or barriers and a retracting mechanism are included in a frontal lens assembly housing. To expose a lens, cover barriers are conventionally moved in opposite directions to either side of the lens, actuated by a manually operable linkage or a motor drive.

However, since the cover barriers are usually pivoted perpendicularly to the optical axis of the lens, a portion of the camera housing must include storage spaces on both sides of the lens for housing the retracted cover barriers. That portion of the camera housing typically becomes wide and bulky, having its frontal area increased by an area equivalent to at least the area of both of the cover barriers.

SUMMARY OF THE INVENTION

It is therefore an object of the present invention to provide an camera having an improved lens cover mechanism able to converse space in a camera body and having a simple and reliable operation.

In order to achieve the object, according to one aspect of the present invention, there is provided a lens cover mechanism for a camera, the lens cover mechanism comprising: a plurality of lens cover plates, the plurality of lens cover plates having (a) a first state wherein the cover plates together cover a lens of the camera, and (b) a second state wherein all of the cover plates are stacked one in front of the other and are moved to a same side of the lens, completely exposing the lens of the camera. Also included is slider mechanism for driving the cover plates between the first and the second states.

Optionally, the cover plates are all driven in a same direction between the first and second states. Further, the sliding mechanism further comprises an operating member associated with the corresponding pinions. The operating member is moved in the direction of movement of the lens cover plates to drive the pinions and thereby to cover and expose the lens.

Further optionally, the sliding mechanism comprises a toothed rack provided to each cover plate of the plurality of cover plates, and each of the toothed racks engages a corresponding pinion. Each of the pinions is a concentrically and unitarily formed portion of a unitary gear. Further, each of the corresponding pinions are of differing pitch circle diameters, and each of the corresponding pinions is driven at a common rate, thereby driving each of the toothed racks at a differing rate. Further, the corresponding pinions are formed having pitch circle diameters of sequential multiples of the diameter of a smallest pinion, and the toothed racks corresponding to the drive pinions are formed having rack lengths of sequential multiples of the length of a shortest toothed rack. The drive pinions and the toothed racks are arranged such that the plurality of overlapping lens covers are at substantially even intervals across the lens when covering the lens, and such that the plurality of overlapping lens covers are substantially overlapping at one side of the lens when exposing the lens.

Still optionally, the lens cover plates cover the lens, in the first state, in front of the lens.

According to still another aspect of the invention, there is provided a lens cover mechanism for a camera, the lens cover mechanism comprising: a plurality of lens cover plates; a corresponding toothed rack provided to each of the cover plates; a corresponding drive pinion provided for each of the toothed racks; and an operating member for driving the drive pinions. The plurality of lens cover plates combine to cover a lens of the camera when the operation member is in a first position, and each of the plurality of cover plates is moved by the pinions and the racks in the same direction to expose the lens of the camera when the operation member is moved to a second position.

Optionally, the corresponding drive pinions are formed having pitch circle diameters of sequential multiples of a diameter of a smallest drive pinion, and the toothed racks corresponding to the drive pinions are formed having rack lengths of sequential multiples of a length of a shortest toothed rack. The drive pinions and the toothed racks are arranged such that the plurality of overlapping lens covers are at substantially even intervals across the lens when covering the lens, and such that the plurality of overlapping lens covers are substantially overlapping at one side of the lens when exposing the lens. Further, each of the corresponding drive pinions is a concentrically and unitarily formed portion of a unitary gear. Further, the operating member is provided with a toothed rack and an idler gear, and the operating member is moved in the direction of movement of the lens cover plates to cover and expose the lens.

According to yet another aspect of the invention, there is provided a lens cover mechanism for a camera, the lens cover mechanism comprising: a first lens cover plate, provided with a first toothed rack; a second lens cover plate, arranged to overlap the first lens cover plate, and provided with a second toothed rack, the second toothed rack being twice as long as the first toothed rack. Also is provided a unitary gear having a first pinion portion associated with the first toothed rack, and a second pinion portion associated with the second toothed rack, the second pinion portion having a pitch circle diameter twice that of the first pinion portion; and an operating member, associated with the unitary gear, for driving the unitary gear. The first and the second lens cover plates combine to cover a lens of the camera when the operation member is in a first position. The first and the second lens cover plates are moved in the same direction to expose the lens of the camera when the operation member is moved to a second position, the second cover plate being moved twice as far as the first cover plate.

Optionally, the operating member is provided with a toothed rack and an idler gear, and the operating member is moved in the direction of movement of the lens cover plates to cover and expose the lens.

According to still yet another aspect of the invention, there is provided a lens cover mechanism for a camera, the lens cover mechanism comprising: a plurality of lens cover plates, the plurality of lens cover plates having a first state wherein the cover plates together cover a lens of the camera, and a second state wherein all of the cover plates are stacked in a sequence one on top of the next, on a same side of the lens, completely exposing the lens of the camera. Also included is a sliding mechanism for driving the cover plates between the first and the second states, such that each sequential cover plate of the plurality of cover plates is driven at a sequential multiple of a speed of a slowest driven cover plate, the sequential multiples corresponding to the sequence of the stacking.

Optionally, the cover plates are all driven in a same direction between the first and second states.

Further optionally, the plurality of cover plates comprises a first cover plate and a second cover plate, and the first cover plate is driven twice as fast as the second cover plate by the drive means between the first and second states.

According to further another aspect of the invention, there is provided a lens cover mechanism for a camera, the lens cover mechanism comprising: a first lens cover plate; a second lens cover plate; and slider mechanism for driving the cover plates between a first state wherein the cover plates together cover a lens of the camera, and a second state wherein the first cover plate is stacked in front of the second cover plate on a same side of the lens, completely exposing the lens of the camera. The first cover plate is driven twice as fast as the second cover plate by the drive means between the first and second states.

DESCRIPTION OF THE ACCOMPANYING DRAWINGS

DESCRIPTION OF THE EMBODIMENTS

With reference to the drawings, an embodiment of the present invention is described.

Figure 1:
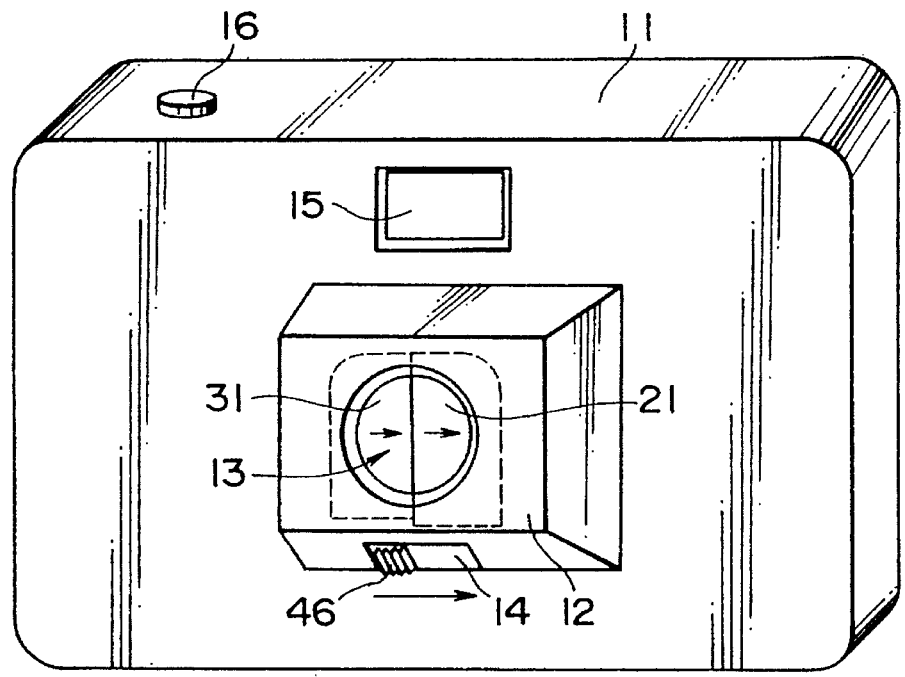
FIG. 1 is a perspective view of a camera to which the present invention is applied, showing a closed state of an embodiment of a lens cover mechanism.
Figure 2:
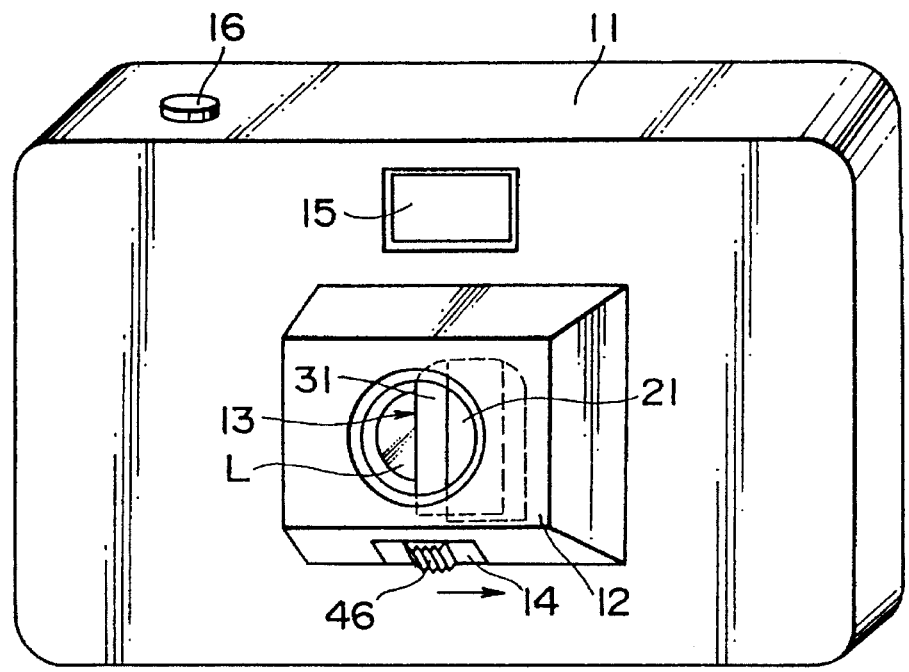
FIG. 2 is a perspective view of a camera to which the present invention is applied, showing a partially open state of the embodiment of a lens cover mechanism.

FIGS. 1 and 2 show a perspective view of a compact camera including an embodiment of a lens cover mechanism 20. The compact camera 11 includes a body housing 11, a frontal lens assembly housing 12, a lens opening 13, and a finder window 15 formed in the body housing 11. A slider groove 14 is formed in the lens assembly housing 12, and a release button 16 is provided to the body housing. The release button 16 is used to actuate the mechanisms associated with the taking of a photograph, including conventional film transport, shutter, metering, and aperture mechanisms (not shown). First and second barriers 31 and 21 of the lens cover mechanism 20 are visible in FIG. 1 (closed position) and in FIG. 2 (partially opened position). A thumb slider 46, for operating the lens cover mechanism 20, is also visible in FIGS. 1 and 2.

Figure 3:
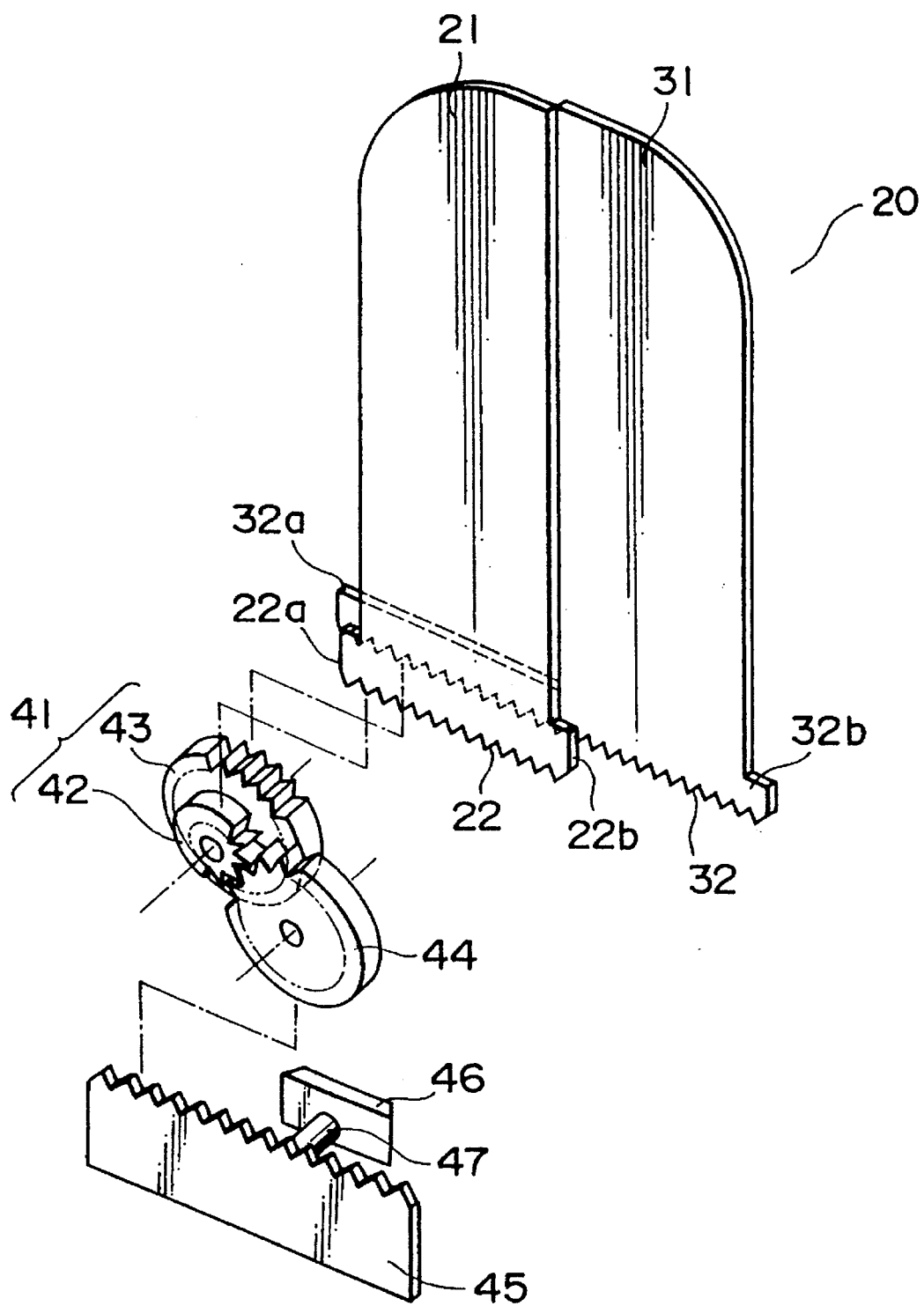
FIG. 3 is a partially exploded perspective view of the embodiment of a lens cover mechanism.

FIG. 3 shows the lens cover mechanism 20 in a partially exploded perspective view. In FIG. 3, the lens cover mechanism 20 is shown unsupported for the sake of clarity. The support structures appear in FIGS. 4 and 5. The first and second barriers 21 and 31 are of approximately the same width, each being wider than half of the diameter of the lens opening 13. The second barrier 31 is positioned in front of, and overlapping the first barrier plate 21. The first and second barriers 21 and 31 are slidably supported by a guide member 51 provided to the lens assembly housing (see FIGS. 4 and 5).

The first and second barriers 21 and 31 are provided at a lower portion with first and second racks 22 and 32 respectively. The first rack 22 extends slightly beyond the width of the first barrier 21 on either side at rack and portions 22a and 22b, while the second rack has a slightly extending rack end portion 32b on one side, and a longer rack extension 32a on the remaining side. The rack extension 32a is slightly longer than the width of the barrier 31 or 21, making the second rack 32 with extension 32a slightly longer than the combined widths of the first and second racks 22 and 32 (not including the extension 32a), and approximately twice the length of the first rack 22.

The first and second racks 22 and 32 both engage a unitary transfer pinion 41. The unitary transfer pinion 41 comprises small and large pinion portions 42 and 43 respectively. The large pinion portion 43 has a pitch circle diameter (PCD) of twice the PCD of the small pinion portion 42 (gear ration 2:1), and engages the second rack 32. The small pinion portion 42 engages the first rack 22. Thus, the second rack 32 is moved at twice the speed (or distance) of the first rack 22 when the unitary transfer pinion 41 is turned. As arranged in FIGS. 3, 4 and 5, the first rack 22 is positioned lower than the second rack 32 by an amount one half the difference in PCD between the large pinion 44 and small pinion 42; the first barrier 21 is therefore taller than the second barrier 31 by a corresponding amount.

The small gear portion 42 of the unitary transfer pinion 41 further engages an idler gear 44, which is driven by a drive rack 45. The drive rack is slidably supported by a guide member 58 provided to the lens assembly housing (see FIGS. 4 and 5). When the drive rack 45 is linearly slid, the idler gear 44 rotates the transfer pinion 41 via the small gear portion 42, and the first and second racks 22 and 32 are thereby moved in the same direction as the drive rack 45 is slid. Each of the transfer pinion 41 and idler gear 44 is provided with a respective axis (not shown) rotatably supported by the lens assembly housing 12.

The drive rack 45 is connected to the thumb slider 46 by means of a post 47, and the thumb slider 46 is arranged in the slider groove 14 of the lens assembly housing 14, as shown in FIGS. 1 and 2. When the thumb slider 46 is slid in the slider groove 14, the drive rack 45 therefore moves in the same direction as the thumb slider 46 and by a corresponding amount.

Figure 4:
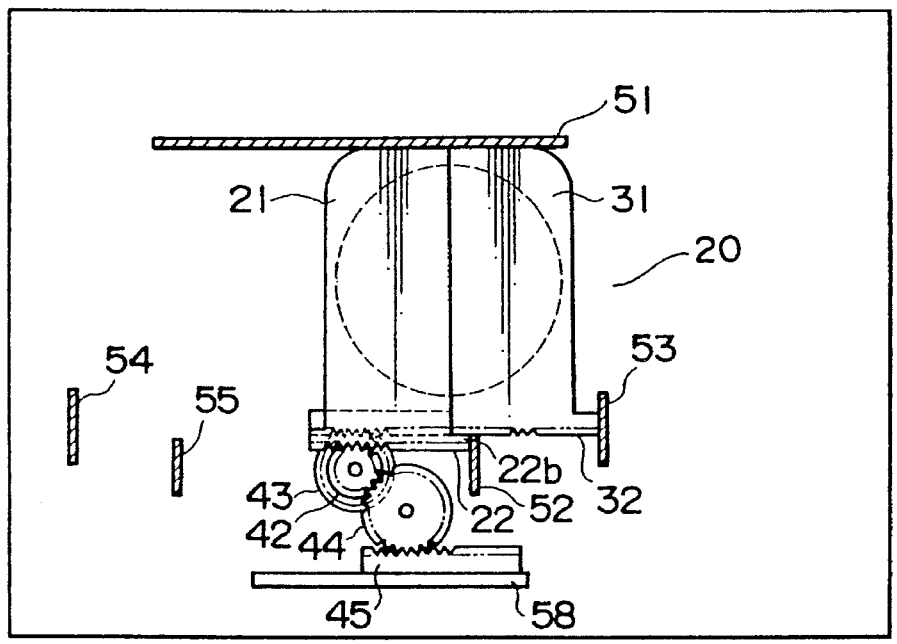
FIG. 4 is a plan view of the embodiment of a lens cover mechanism, showing a closed state.
Figure 5:
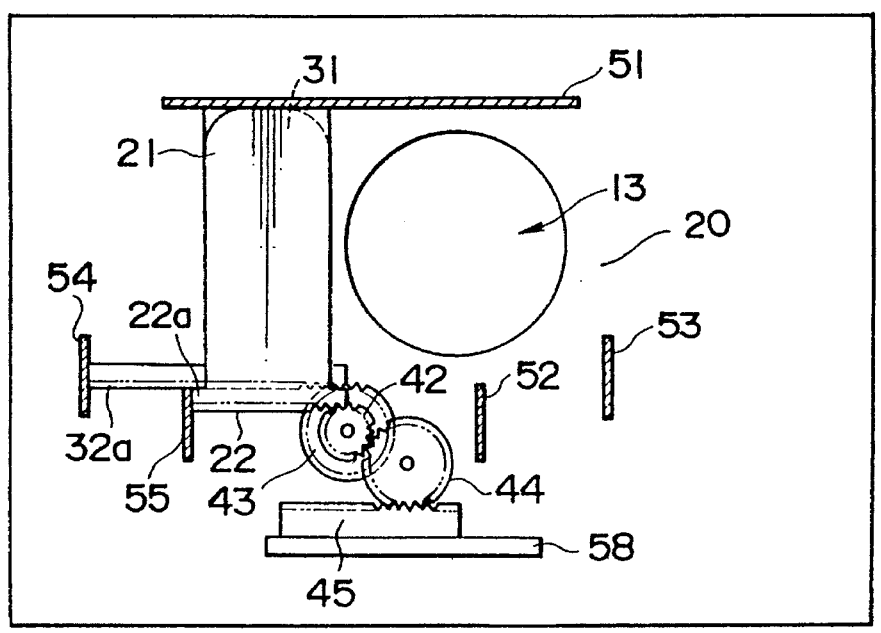
FIG. 5 is a plan view of the embodiment of a lens cover mechanism, showing an open state.

As shown in FIGS. 4 and 5, stoppers 52 and 55 are provided to the lens assembly housing 12 to limit the travel of the first rack 22 and first barrier 21, and are positioned such that they do not interfere with the motion of the second rack 32. Stoppers 53 and 54 are further provided to the lens assembly housing 12 to limit the travel of the second rack 32 and second barrier 31, and are positioned such that they do not interfere with the motion of the first rack 22.

FIGS. 4 and 5 show the closed and opened positions of the lens cover mechanism 20, respectively. In FIG. 4, the first and second barriers 21 and 31 overlap to completely close the lens opening 13. In the closed position, the position of the first barrier 21 is defined as the end portion 22b (of the first rack 22) abuts the stopper 52, and the position of the second barrier 32 is defined as the end portion 32b abuts the stopper 53.

As seen from the perspective of FIGS. 4 and 5, the thumb slider 46 (not shown in FIGS. 4 or 5) is slid to the left to open the lens cover mechanism 20, moving the drive rack 45 to the left. The idler gear 44 is driven clockwise, in turn driving the transfer pinion 41 counterclockwise via the small pinion portion 42. The small pinion portion 42 thereby drives the first rack 22 and first barrier 21 to the left at a predetermined rate, while the large pinion portion 43 drives the second rack 32 and second barrier 31 to the left at twice the predetermined rate. As the barriers 21 and 31 move to the left, the second barrier 31 travels twice as far as the first barrier 21, and slips in front of the first barrier 21. The fully opened position, shown in FIG. 5, is reached when the first barrier 31 is directly in front of the second barrier 21, and both barriers 21 and 31 are removed from the lens opening 13. At this point, the end portion 22a of the first rack 22 abuts the stopper 55, and the rack extension 32a abuts the stopper 54, appropriately defining the positions of the first and second barriers 21 and 31.

Thus, the two barriers 21 and 31 are easily slid away from the lens opening, and positioned one in front of the other such that the space occupied is minimized. As can be seen from FIGS. 4 and 5, the positions of the stoppers 52 through 55 define the necessary space taken by the mechanism 20, in such a way that nearly no space is necessary on one side of the lens opening (right side of FIGS. 4 and 5), and only a portion of the available space on the remaining side of the lens opening 13 (left side of FIGS. 4 and 5) is occupied by the mechanism 20.

The described embodiment uses an idler gear 44 to make the barriers 21 and 31 slide in the same direction as the thumb slider 46 (and drive rack 45) is pushed. However, the barriers 21 and 31 may slide in the opposite direction to the direction of movement of the thumb slider 46, in which case the idler gear is omitted and the drive rack 45 directly drives one of the pinion portions 42 and 43 of the unitary transfer pinion 41. Further alternatively, a knurled wheel (not shown) or other rotary member is provided to the idler gear 44 or to an engaging drive pinion, to drive the transfer pinion 41 by a rotary motion as opposed to the linear motion of the embodied drive rack 58.

The present disclosure relates to subject matter contained in Japanese Utility Model Application No. HEI 05-070104, filed on Dec. 27, 1993, which is expressly incorporated herein by reference in its entirety.

What is claimed is:

1. A lens cover mechanism for a camera, said lens cover mechanism comprising:

a plurality of lens cover plates disposed at an object facing side of an objective lens of said camera, said plurality of lens cover plates having a first state wherein each of said plurality of lens cover plates covers a portion of said objective lens and, said plurality of lens cover plates together cover said objective lens of said camera, and a second state wherein all of said cover plates are stacked one in front of the next and moved to a same side of said objective lens, completely exposing said objective lens of said camera; and means for driving said cover plates between said first and said second states.

2. The mechanism according to claim 1, wherein said cover plates are all driven in a same direction between said first and second states.

3. The lens cover mechanism according to claim 1, wherein said driving means comprises a toothed rack provided to each cover plate of said plurality of cover plates, and each of said toothed racks engages a corresponding pinion.

4. The lens cover mechanism according to claim 3, wherein each of said pinions is a concentrically and unitarily formed portion of a unitary gear.

5. The lens cover mechanism according to claim 3, wherein each of said corresponding pinions are of differing pitch circle diameters, and wherein each of said corresponding pinions is driven at a common rate, thereby driving each of said toothed racks at a differing rate.

6. The lens cover mechanism according to claim 5, wherein said corresponding pinions are formed having pitch circle diameters of sequential multiples of the diameter of a smallest pinion, and said toothed racks corresponding to said drive pinions are formed having rack lengths of sequential multiples of the length of a shortest toothed rack, and wherein said drive pinions and said toothed racks are arranged such that said plurality of overlapping lens covers are at substantially even intervals across said lens when covering said lens, and such that said plurality of overlapping lens covers are substantially superimposed at one side of said lens when exposing said lens.

7. The lens cover mechanism according to claim 2, said driving means further comprising an operating member associated with said corresponding pinions, and wherein said operating member is moved in the direction of movement of said lens cover plates to drive said pinions and thereby to cover and expose said lens.

8. The lens cover mechanism according to claim 1, wherein said lens cover plates cover said lens, in said first state, in front of said lens.

9. The lens cover mechanism for a camera according to claim 1, said driving means comprising a pinion for driving each cover plate, a pitch circle diameter of one of said pinions being a multiple of a pitch circle diameter of another of said pinions.

10. A lens cover mechanism for a camera, said lens cover mechanism comprising:

a plurality of lens cover plates disposed at an object facing side of an objective lens of said camera;

a corresponding toothed rack provided for each of said cover plates;

a corresponding drive pinion provided for each of said toothed racks; and an operating member for driving said drive pinions, wherein each of said plurality of lens cover plates cover a portion of said objective lens, and said plurality of lens cover plates combine to cover said objective lens of said camera when said operation member is in a first position, and each of said plurality of cover plates is moved by said pinions and said racks in the same direction to expose said objective lens of said camera when said operation member is moved to a second position.

11. The lens cover mechanism according to claim 10, wherein said corresponding drive pinions are formed having pitch circle diameters of sequential multiples of a diameter of a smallest drive pinion, and said toothed racks corresponding to said drive pinions are formed having rack lengths of sequential multiples of a length of a shortest toothed rack, and wherein said drive pinions and said toothed racks are arranged such that said plurality of overlapping lens covers are at substantially even intervals across said lens when covering said lens, and such that said plurality of overlapping lens covers are substantially superimposed at one side of said lens when exposing said lens.

12. The lens cover mechanism according to claim 11, wherein each of said corresponding drive pinions is a concentrically and unitarily formed portion of a unitary gear.

13. The lens cover mechanism according to claim 11, wherein said operating member is provided with a toothed rack and an idler gear, and said operating member is moved in the direction of movement of said lens cover plates to cover and expose said lens.

14. A lens cover mechanism for a camera, said lens cover mechanism comprising:

a first lens cover plate, provided with a first toothed rack;

a second lens cover plate, arranged to overlap said first lens cover plate, and provided with a second toothed rack, said second toothed rack being twice as long as said first toothed rack;

a unitary gear having a first pinion portion associated with said first toothed rack, and a second pinion portion associated with said second toothed rack, said second pinion portion having a pitch circle diameter twice that of said first pinion portion; and an operating member, associated with said unitary gear, for driving said unitary gear, wherein said first and said second lens cover plates combine to cover a lens of said camera when said operation member is in a first position, and said first and said second lens cover plate are moved in the same direction to expose said lens of said camera when said operation member is moved to a second position, said second cover plate being moved twice as far as said first cover plate.

15. The lens cover mechanism according to claim 14, wherein said operating member is provided with a toothed rack and an idler gear, and said operating member is moved in the direction of movement of said lens cover plates to cover and expose said lens.

16. The lens cover mechanism for a camera according to claim 14, said first and second lens cover plates disposed at an object facing side of said lens, said lens comprising an objective lens of said camera.

17. A lens cover mechanism for a camera, said lens cover mechanism comprising:

a plurality of lens cover plates disposed at an object facing side of an objective lens of said camera, said plurality of lens cover plates having a first state wherein each of said plurality of lens cover plates cover a portion of said objective lens, and said plurality of lens cover plates together cover said objective lens of said camera, and a second state wherein all of said cover plates are stacked in sequence one on top of the next and moved to a same side of said lens, completely exposing said objective lens of said camera; and means for driving said cover plates between said first and said second states, such that each sequential cover plate of said plurality of cover plates is driven at a sequential multiple of a speed of a slowest driven cover plate, said sequential multiples corresponding to said sequence of said stacking.

18. The mechanism according to claim 17, wherein said cover plates are all driven in a same direction between said first and second states.

19. The mechanism according to claim 17, wherein said plurality of cover plates comprises a first cover plate and a second cover plate, and said first cover plate is driven twice as fast as said second cover plate by said drive means between said first and second states.

20. A lens cover mechanism for a camera, said lens cover mechanism comprising:

a first lens cover plate disposed at an object facing side of an objective lens of said camera;

a second lens cover plate disposed at an object facing side of said objective lens of said camera; and means for driving said first and said second cover plates between a first state wherein each of said first and second cover plates cover a portion of said objective lens, and said first and second cover plates together cover said objective lens of said camera, and a second state wherein first cover plate is stacked in front of said second cover plate, and said first and second cover plates are moved to a same side of said objective lens, completely exposing said objective lens of said camera, wherein said first cover plate is driven twice as fast as said second cover plate by said drive means between said first and second states.

* * * * *